G. MECKBACH.
BINOCULAR TELESCOPE.
APPLICATION FILED JAN. 12, 1912.
1,037,505.
Patented Sept. 3, 1912.
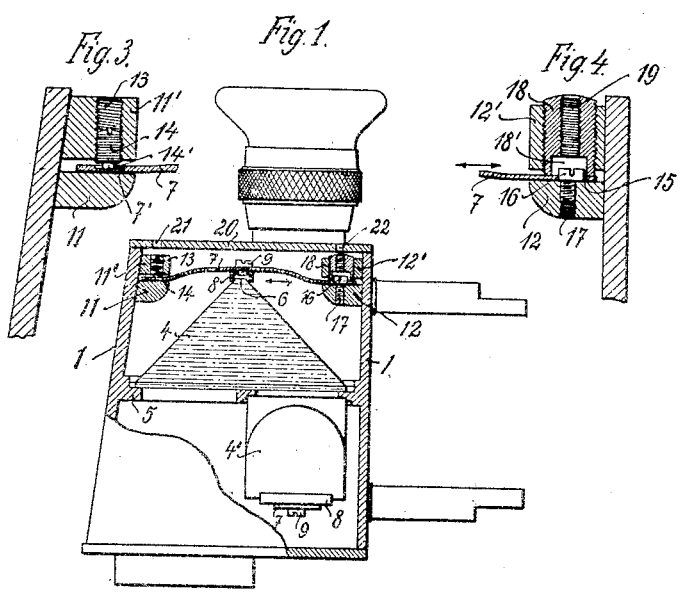
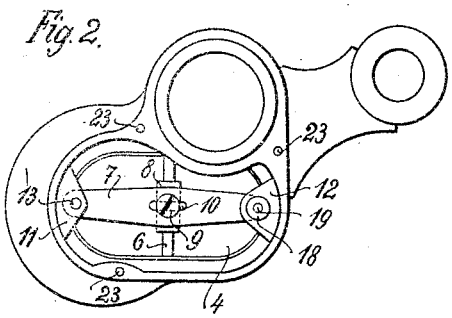
Witnesses:
M. Reimer
M. Hamilton
Inventor:
Georg Meckbach
by his attorneys
James Hamilton
Hamilton Hamilton

UNITED STATES PATENT OFFICE.

GEORG MECKBACH, OF SCHÖNEBERG, NEAR BERLIN, GERMANY.

BINOCULAR TELESCOPE.

1,037,505. Specification of Letters Patent. Patented Sept. 3, 1912.

Application filed January 12, 1912. Serial No. 670,737.

*To all whom it may concern:*

Be it known that I, GEORG MECKBACH, manager, a subject of the Emperor of Germany, residing at Schöneberg, near Berlin, in the Kingdom of Prussia, Germany, have invented certain new and useful Improvements in Binocular Telescopes, of which the following is a specification.

My invention relates to improvements in binocular telescopes, and particularly in that class of binocular telescopes in which the rays of the light pass through a pair of triangular prisms. And the object of the improvements is to provide a telescope of this class in which the prisms can be adjusted from the outside of the telescope without opening the casing thereof, so that such adjustment can be effected after mounting the telescope. This is of importance, because the prisms which are adjusted prior to closing the casing are liable to be slightly displaced, and because the means for holding the prism in place are frequently loosened. It is not feasible to secure the said holding means by means of a set screw, because there is not sufficient room, and because perforations in the wall of the casing as would be required for the set screw must as far as possible be avoided. In my improved telescope the upper corner of the prism which is opposite to the hypotenuse is held by means of a bridge piece which is mounted in such a way as to be longitudinally shiftable and to take along the prism in the direction of its hypotenuse, while the latter always uniformly bears on its seat. For adjusting the said bridge the latter is engaged by a setting member such for example as an eccentric which is accessible from the side of the lid of the telescope, and it is set in adjusted position by set screws which are likewise accessible from the side of the lid, so that the prism can not afterward be displaced.

In order that my invention be more clearly understood an example embodying the same has been shown in the accompanying drawing in which the same numerals of reference have been used in all the views to indicate corresponding parts.

In said drawing—Figure 1, is a longitudinal section of one half of the telescope, Fig. 2, is a plan view of Fig. 1, Fig. 3, is a vertical section showing the set screw for securing the bridge piece in position on an enlarged scale, and Fig. 4, is a similar section of the adjusting member.

Within the casing 1 of the telescope a pair of prisms 4 and 4' are mounted on a transverse frame 5 so as to be slightly slidable thereon in the direction of their hypotenuses, so that they can be accurately adjusted symmetrically of the passages formed by the frame. Above the upper corner 6 of the prism which is opposite to the hypotenuse a bridge piece 7 of spring material is located which at its bottom side is equipped with a U-shaped member 8 engaging the upper corner 6 of the prism. As shown the said member is rotatable and longitudinally slidable on the bridge piece for which purpose it is secured thereto by means of a screw 9 passing through a longitudinal slit 10 of the bridge piece. By means of the said screw preliminary adjustment is imparted to the prism, whereupon the screw 9 is tightened so that it is immovable within the slit 10.

As shown the bridge piece 7 is supported at its ends between pairs of lugs 11, 11' and 12, 12' projecting from the side walls of the casing. The upper lug 11' is formed with an internally screw-threaded longitudinal bore 13 through which a clamping screw 14 is screwed by means of which the end of the bridge 7 located between the lugs 11, 11' is secured in position. As shown in Fig. 3, the clamping screw is formed with a small central projection 14' which when the screw is screwed down passes into a longitudinal groove 7' formed in the upper surface of the bridge 7. The projection 14' and the longitudinal groove 7' provide a guide for this end of the bridge, so that it can not be displaced laterally. When screwing down the screw 14 its projection 14' forces the end of the bridge in rigid contact with the lower lug 11, whereby the bridge end is securely held in place. The opposite end of the bridge which is located between the lugs 12 and 12' is formed with a bore 15 engaged by the head 16 of a screw 17 screwed into the lower lug 12. As shown the head of the screw is eccentric to the shaft of the screw so as to form a cam by means of which when turning the screw the bridge is longitudinally shifted according to the eccentricity of the head. The said longitudinal displacement takes place in either one of the directions indicated by the arrow shown in Fig. 4. The upper lug 12' is provided with a screw-threaded bore into which an internally screw-threaded sleeve 18 is screwed which is provided with internal screw-threads 19. Through the bore of the sleeve a screw driver can be inserted which is adapted to engage the screw head 16. At its lower end the bore of the sleeve is enlarged as shown at 18', and this enlarged portion receives the screw head 16, so that the sleeve can be firmly forced with its lower end on the bridge 7 without contacting with the screw head 16. Above the lugs 11' and 12' the lid 20 is formed with apertures 21, 22 which can be closed by screws (not shown). After removing the said screws the set screw 14 and the eccentric screw head 16 are accessible even if the case is closed. If the lid 20 is thin, the closing screws and their bolts can be located within the screw-threaded bores 13 and 19 of the lugs 11' and 12'.

Preliminary adjustment is applied to the prism while the casing is open and the screw 9 is loose, and after the preliminary adjustment has been effected the screw 9 is tightened. Thereupon the clamping screw 14 and the sleeve 18 are forced on the ends of the bridge 7. After applying the lid to the casing the screw 14 is slightly loosened, if readjustment is necessary, and the sleeve 18 is slightly retracted from the bridge. By means of a screw driver passed through the bore 19 the eccentric screw 16 is now turned in the proper direction, whereby the bridge 7 is shifted in one or the other direction indicated by the arrow shown in Fig. 4. In this adjustment the bridge is guided with its end located between the lugs 11 and 11' on the projection 14', so that it can not be displaced laterally when being adjusted by the eccentric screw head 16. When the prism has thus been brought in its proper position, the clamping screw 14 is tightened in order to prevent the bridge from being displaced by the sleeve 18 being screwed down. When both screws have been screwed down the prism is rigidly held in place.

The lower prism 4' is equipped with similar adjusting means, as is indicated in Fig. 1. The lid is fastened by means of screws passed through bores 23.

I claim herein as my invention:

1. In a telescope of the class described, the combination with the casing and a prism mounted therein; of a prism-shifting device for moving the prism transversely of the optical axis of the telescope, said device being provided with a prism-holder adjustable therealong for giving the prism its rough adjustment; and mechanism for reciprocating said shifting device and its prism-holder to give the prism its fine adjustment.

2. In a telescope of the class described, the combination with the casing and a prism mounted therein; of a prism-shifting device which extends transversely of the optical axis of the telescope and engages the prism; mechanism mounted within the casing and accessible from outside the same for reciprocating said device; and clamping means for fastening the latter in its adjusted position.

3. In a telescope of the class described, the combination with the casing and a prism mounted therein; of means accessible from the outside of the casing for imparting fine adjustment to the prism; said means being provided with a device which engages the prism and is displaceable for giving rough adjustment thereto.

4. In a telescope of the class described, the combination with the casing, having a lid transverse to the optical axis of the telescope, and a prism adjustable transversely of the optical axis of the telescope, of a bridge device operatively connected with said prism and adapted to impart adjusting movement thereto, and a cam for reciprocating said bridge device, said cam being accessible through the lid of the casing.

5. In a telescope of the class described, the combination with the casing having a lid transverse to the optical axis of the telescope, and a prism adjustable transversely of the optical axis of the telescope, of a bridge member connected to the corner of the prism which is opposite to its hypotenuse, and a cam engaging said bridge member, and adapted to impart adjusting movement thereto, said cam being accessible through the lid of the casing.

6. In a telescope of the class described, the combination with the casing having a lid transverse to the optical axis of the telescope, and a prism adjustable transversely of the optical axis of the telescope, of a bridge member connected to the corner of the prism which is opposite to its hypotenuse, a cam engaging said bridge member, and a sleeve screwed into the casing from the side of the lid and receiving said cam in its hollow and adapted to clamp said bridge member, said lid having a bore in line with the hollow of the sleeve.

7. In a telescope of the class described, the combination with the casing, and a prism, of a bridge member engaging said prism at a point intermediate its ends and having a longitudinal groove at one end, a clamping screw engaging said bridge member within its groove, and means for reciprocating said bridge member to move said prism transversely; said means acting upon the other end of said bridge member and said screw and the walls of said groove coöperating to control the direction of the adjusting movement of the bridge member.

In testimony whereof I affix my signature in presence of two witnesses.

GEORG MECKBACH.

Witnesses:
WOLDEMAR HAUPT,
HENRY HASPER.